US007102803B2

(12) United States Patent
Psaltis et al.

(10) Patent No.: US 7,102,803 B2
(45) Date of Patent: Sep. 5, 2006

(54) APPARATUS AND METHOD OF USING A THERMAL DESIGN FOR WAVELENGTH DIVISION MULTIPLEXED HOLOGRAPHIC FILTERS

(75) Inventors: Demetri Psaltis, Pasadena, CA (US); George Panotopoulos, Palo Alto, CA (US); Hung-Te Hsieh, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 459 days.

(21) Appl. No.: 10/716,322

(22) Filed: Nov. 18, 2003

(65) Prior Publication Data

US 2004/0227982 A1 Nov. 18, 2004

Related U.S. Application Data

(60) Provisional application No. 60/441,996, filed on Jan. 23, 2003.

(51) Int. Cl.
*G02B 5/32* (2006.01)

(52) U.S. Cl. .............................. 359/15; 359/3; 359/573; 359/1; 385/37

(58) Field of Classification Search .................. 359/15, 359/3, 19, 566, 1, 569; 385/37
See application file for complete search history.

(56) References Cited

U.S. PATENT DOCUMENTS

| 2003/0007733 A1* | 1/2003 | Levner et al. ................. 385/37 |
| 2003/0048975 A1* | 3/2003 | Lackritz et al. ............... 385/14 |
| 2004/0246477 A1* | 12/2004 | Moon et al. ................. 356/300 |

* cited by examiner

*Primary Examiner*—Fayez G. Assaf
(74) *Attorney, Agent, or Firm*—Daniel L. Dawes; Myers Dawes Andras & Sherman LLP

(57) ABSTRACT

A temperature compensated apparatus for filtering light is comprised of a holographically recorded grating defined in a photosensitive layer for providing optical filtration for light incident on the grating with a predetermined angle of incidence, and an angulation means responsive to temperature for tilting the grating relative to the angle of incidence of the light as a function of temperature of the grating so that changes in the filtration by the grating compensate for changes in temperature of the grating to maintain effective filtration of the light approximately constant.

20 Claims, 5 Drawing Sheets

APPARATUS AND METHOD OF USING A THERMAL DESIGN FOR WAVELENGTH DIVISION MULTIPLEXED HOLOGRAPHIC FILTERS

RELATED APPLICATIONS

The present application is related to U.S. Provisional Patent Application Ser. No. 60/441,996, filed on Jan. 23, 2003, which is incorporated herein by reference and to which priority is claimed pursuant to 35 USC 119.

BACKGROUND OF THE INVENTION

1. Field of the Invention

The invention is directed to an athermal design which maintains the characteristics of the wavelength division multplexed filters (center wavelength, bandwidth, etc.) as invariant as possible with respect to temperature fluctuations.

2. Description of the Prior Art

Holographic filters can be employed for wavelength division multplexed applications. Temperature dependence is a critical concern for telecommunication. In thin film filter technology, by a wise choice of materials, thermal drift can be compensated for by deposing alternate layers of materials with opposite thermal expansion coefficients to fabricate athermal thin film filters. However, such flexibility isn't available in bulk holographic filters. A feasible system solution will be proposed to compensate for the effects of temperature changes.

BRIEF SUMMARY OF THE INVENTION

The invention is a temperature compensated apparatus for filtering light comprising a holographically recorded grating defined in a photosensitive layer for providing optical filtration for light incident on the grating with a predetermined angle of incidence, and an angulation means responsive to temperature for tilting the grating relative to the angle of incidence of the light as a function of temperature of the grating so that changes in the filtration by the grating compensate for changes in temperature of the grating to maintain effective filtration of the light approximately constant.

In one embodiment the angulation means comprises a bimetallic strip having a differential thermal expansion coefficient and wherein light is reflected from the strip at the predetermined angle of incidence. The differential thermal expansion coefficient of the strip is selected to vary the curvature of the strip and hence the angle of incidence of the light by a degree approximately corresponding to the shift in filtration response of the grating as a function of temperature so that Bragg filtration provided by the grating is approximately independent of temperature of the grating. The bimetallic strip is comprised of a aluminum and silicon composite.

The grating is characterized by a Bragg wavelength, $2n\Lambda\cos\theta_{in} = \lambda_B(T)$ where n is the index of refraction of the bulk material of the layer, $\Lambda$ is the period of the grating, $\theta_{in}$ is the internal angle of the incident light within the layer and $\lambda_B(T)$ is the Bragg wavelength as a function of temperature of the grating, T, the angulation means changing $\theta_{in}$ of the light to approximately match the change in Bragg wavelength $\lambda_B(T)$ for a change in temperature, $\Delta T$. The Bragg wavelength $\lambda_B(T)$ is determined by a 0.5 dB criterion.

Alternatively the angulation means changes the angle of incidence of the light according to $$\frac{\cos(\theta_B + \Delta\theta)}{\cos\theta_B} = \frac{1}{(1 + a\Delta T)(1 + b\Delta T)}$$

where $\Delta T$ is the change in temperature of the grating, where a is the thermal expansion coefficient of the layer, where b is the thermal coefficient of the dielectric constant and hence the index of refraction of the layer, where $\theta_B$ is the Bragg angle corresponding to a target wavelength for filtration when $\Delta T=0$, and where $\Delta\theta_B$ is the change in the Bragg angle made to compensate to the temperature change $\Delta T$.

The invention is also defined as a method for temperature compensating a Bragg filter by the apparatus described above. Namely the method comprises the steps of: providing a holographically recorded grating defined in a photosensitive layer for providing optical filtration; directing light incident on the grating at a predetermined angle of incidence; and controlling the angle of incidence of the light relative to the grating in response to temperature changes in the grating so that filtration by the grating compensates for changes in temperature of the grating to keep effective filtration approximately constant.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
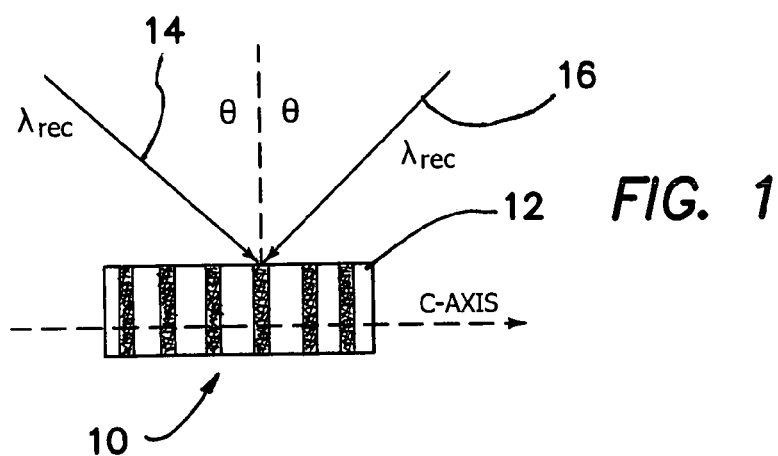
FIG. 1 is symbolic depiction of a recording of a holographic grating.

A grating 10 holographically imprinted inside a recording material 12 can be operated as a WDM filter in the reflection geometry, as shown in FIG. 1. The wavelength satisfying the grating equation (1) below will be strongly reflected, whereas the other wavelengths pass through the filter unaffected.

$$\lambda_B = 2n(T_0)\Lambda(T_0)\cos\theta_B \qquad (1)$$

where $n(T_0)$ is the refractive index of the material at $\lambda_B$ at temperature $T_0$ and $\Lambda(T_0)$ is the period of the index grating at $T_0$. By inspecting equation (1), we notice that we can Bragg match the grating to a shorter wavelength if we tilt the incident beam away from the normal. Thus by tilting the incident beam away from the normal we are able to Bragg match the grating 10 to a shorter wavelength as it changes as a function of temperature.

Temperature changes affect holographic filters mainly through two mechanisms: (Other possible effects will be neglected here, e.g. the thermal dependence of the piezoelectric tensor will manifest itself when stress is being applied.)

1. Thermal expansion or contraction of the bulk material (in the illustrated embodiment, LiNbO$_3$:Fe).
2. Thermal dependence of the dielectric constant of the bulk material.

Assume the Bragg wavelength of the filter is $\lambda_B$ corresponding to an incident angle $\theta_B$ ($\theta_B$ is the angle measured inside the crystal, whereas $\theta_B'$ is measured outside the crystal) at temperature $T_0$. When the temperature changes to $T_0+\Delta T$, the Bragg wavelength of the filter will have a corresponding shift and move to $\Delta_B+\Delta\lambda$. If we adjust the incident angle by $\Delta\theta$ such that the Bragg wavelength shifts back to $\lambda_B$, we will have $$\lambda_B = 2n(T_0+\Delta T)\Lambda(T_0+\Delta T)\cos(\theta_B+\Delta\theta) \qquad (2)$$

If the thermal expansion coefficient (TEC) and the refractive index dependence on temperature are both linear within the temperature range of interest, we have $n(T_0+\Delta T) \cong n(T_0)(1+a\Delta T)$ and $\Lambda(T_0+\Delta T) \cong \Lambda(T_0)(1+b\Delta T)$. From equations (1) and (2), we can derive a relation between $\Delta\theta$ and $\Delta T$ for a constant Bragg wavelength in spite of temperature changes.

$$\frac{\cos(\theta_B+\Delta\theta)}{\cos\theta_B} = \frac{1}{(1+a\Delta T)(1+b\Delta T)} \qquad (3)$$

Since both thermal coefficients a and b are positive, we conclude that as the temperature rises, the Bragg wavelength of a given filter will shift upward, i.e., to a longer wavelength. To compensate for such a shift, we tilt the beam away from the normal. On the other hand, to undo the effect caused by a temperature drop, we adjust the beam toward the normal.

Figure 5:
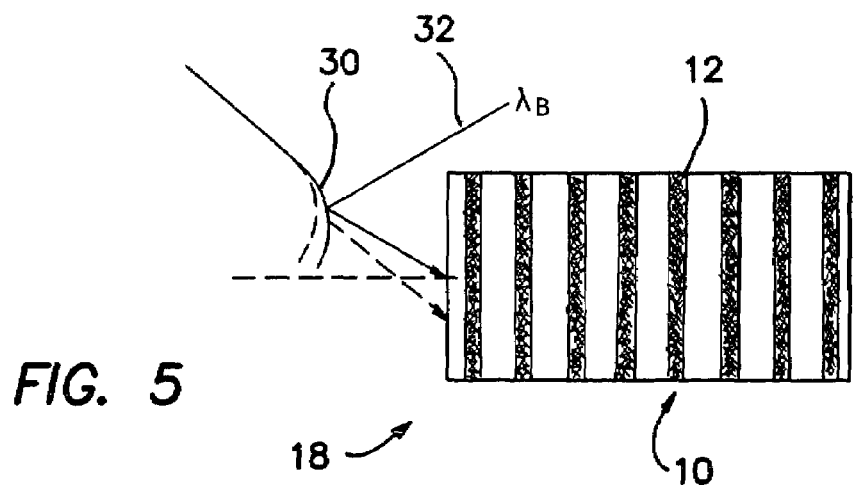
FIG. 5 is a symbolic depiction of an athermal design utilizing an Al—Si composite beam microactuator.

Based on equation 3, the athermal design of the invention maintains the Bragg wavelengths of WDM filters 18 invariant with respect to temperature fluctuations. The principle of operation is illustrated in FIG. 5. We use a bimetallic composite beam 30 to control the direction of the incident light beam 32. The device makes use of the TEC discrepancy between two properly chosen materials (in the illustrated embodiment, aluminum and silicon) and deflects as the temperature changes. We operate the filter 18 away from normal incidence because compensation for negative temperature drifts cannot be carried out near normal.

Figure 3:
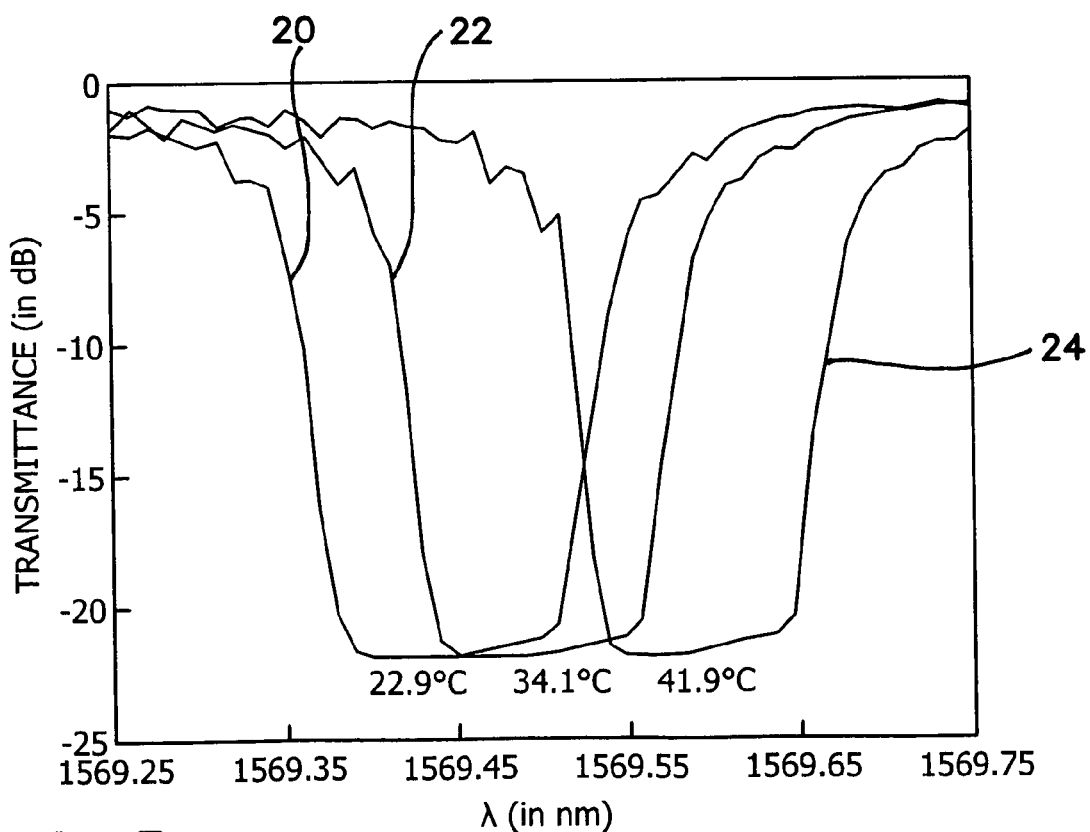
FIG. 3 is a graph of the filter response measured in the through channel at normal incidence for three different temperatures.

The reflectance of the filter 18 at normal incidence ($\theta=0$) is shown in the graph of FIG. 3 for three different temperatures, curve 20 is the transmittance for the LiNbO$_3$ filter at 22.9° C., curve 22 is the transmittance at 34.1° C. and curve 24 is the transmittance at 41.9° C. The Bragg wavelength $\lambda_B$(center wavelength) of the filter of FIG. 3 at 24.3° C. is estimated to be 1569.45 nm with a bandwidth of 0.134 nm (about 16.75 GHz). The criterion used to calculate the Bragg wavelength $\lambda_B$ is as follows: first find the two points of the filter 18 whose through-channel transmittances are 0.5 dB higher than the minimum transmittance, which points are then defined as the band edges of the filter. The Bragg wavelength is then calculated as the average of the two edge wavelengths and the bandwidth as the difference between them. This process is called "the 0.5 dB criterion".

Figure 2:
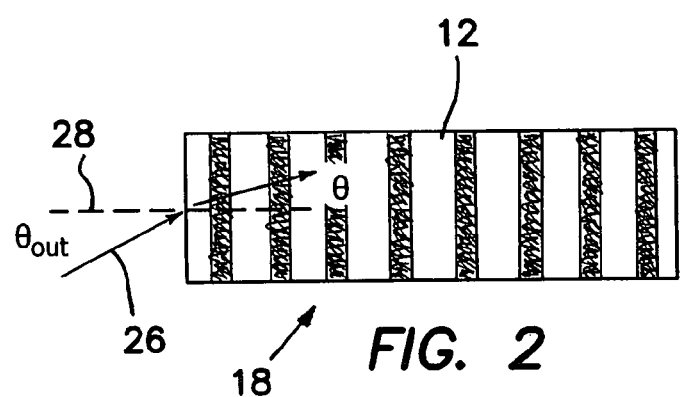
FIG. 2 is a symbolic depiction of a holographic grating operated as a wavelength division multplexed filter in reflection geometry.

In the illustrated embodiment, holographic filters 18 are recorded in a lithium niobate (LiNbO$_3$) layer 12 by interfering two CW laser beams 14 and 16 inside the crystal of layer 12 as shown in FIG. 1. A stabilization system has been incorporated into the recording setup in order to prevent the interference pattern from drifting. By properly choosing the angle $2\theta$ between the recording beams 12 and 16 the Bragg wavelength of the grating 10 is controlled when operated in the reflection geometry as a wavelength division multplexed filter 18 as shown in FIG. 2.

Within the temperature ranges of interest, we may assume to a good approximation that both thermal expansion and thermal dielectric constant changes are also linear. In addition, we know that both coefficients are positive. The athermal design of the wavelength division multiplexed filters 18 can therefore be implemented as follows. As temperature rises, the Bragg wavelength of a given filter 18 will shift upward, i.e. towards longer wavelengths. To compensate for such a shift, we tilt the beam 26 away from the normal 28. On the other hand, to undo the effect caused by a temperature drop, we'll need to adjust the beam 26 towards the normal 28 as shown in FIG. 2.

Figure 4:
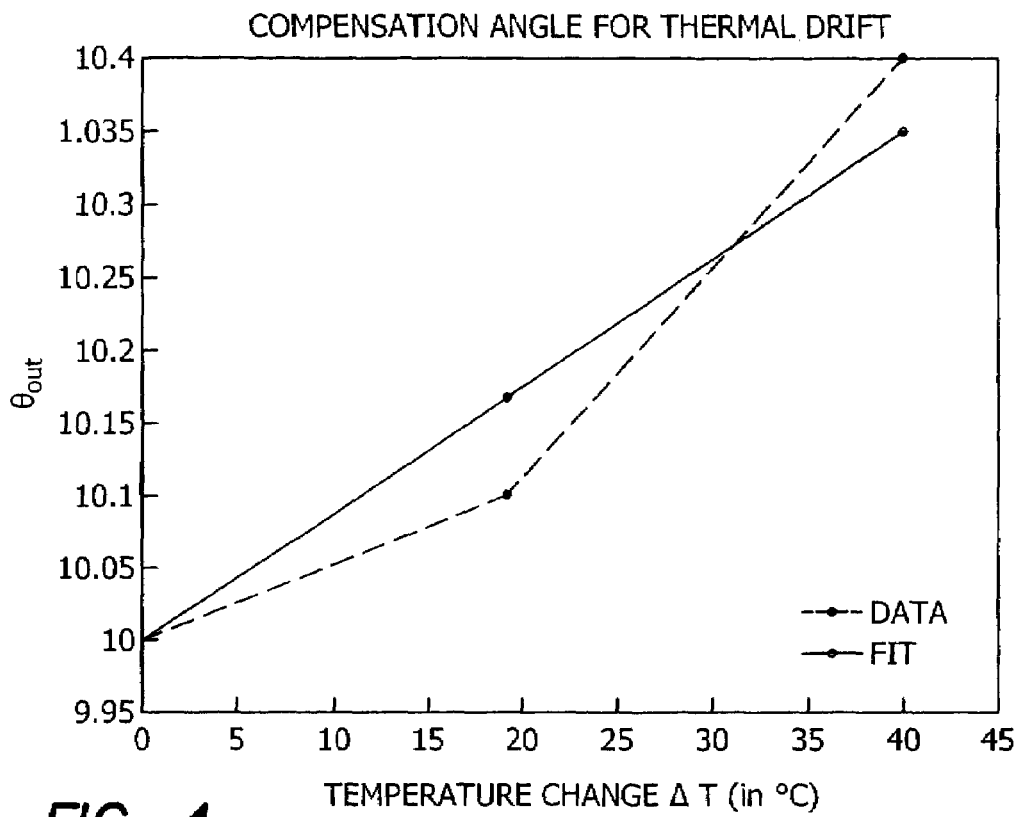
FIG. 4 is a graph of the compensation angle for thermal drift of Bragg wavelength as a function of temperature change.

To verify the above statement, we first determine the "0.5 dB criterion" center wavelengths for a series of incident angles at four different temperatures (22.9° C., 41.9° C., 49.1° C., 62.9° C.). Temperature monitoring is made possible by reading the resistance off a thermistor (not shown) in close contact with the LiNbO$_3$ crystal 12 when the whole system is in thermal equilibrium. A thermoelectric cooler 34 (not shown) is used to control the temperature of the system. The center wavelength corresponding to the incident angle $\theta_{out}=10°$ ($\theta_{in}\approx 4.5°$) at the lowest temperature is chosen as our target wavelength for angular compensation. For each of the other temperatures, we are able to pick a center wavelength that's closest to the target wavelength along with the corresponding incident angle. We therefore end up with compensation angle $\theta_{out}=\theta_B+\Delta\theta$ as a function of temperature change. This angle is plotted in FIG. 4.

The fit is done according to the following formula:

$$\frac{\cos(\theta_B+\Delta\theta)}{\cos\theta_B}=\frac{1}{(1+a\Delta T)(1+b\Delta T)}$$

Here a and b are the thermal expansion coefficient and the thermal coefficient of dielectric constant, respectively and $\theta_B$ is the Bragg angle corresponding to the target wavelength when $\Delta T=0$. By slightly tilting the incident beam Bragg wavelength drifts due to changes of the ambient temperature are compensated.

Our data suggest that for operation around an incident angle $\theta_{out}$ of 10 degrees, an angular correction $\Delta\theta$ of 0.88 degrees will be required for a temperature change of 100° C. Such an angular fine-tuning can be achieved by bimetallic composite beam 30, which makes use of the thermal expansion coefficient discrepancy between two properly chosen materials. The principle of operation is illustrated in FIG. 5. The aluminum-silicon composite beam 30 will be designed in such a way that it deflects 0.44 degrees for a temperature change of 100° C. so that $2\theta=0.88$.

Figure 6A:
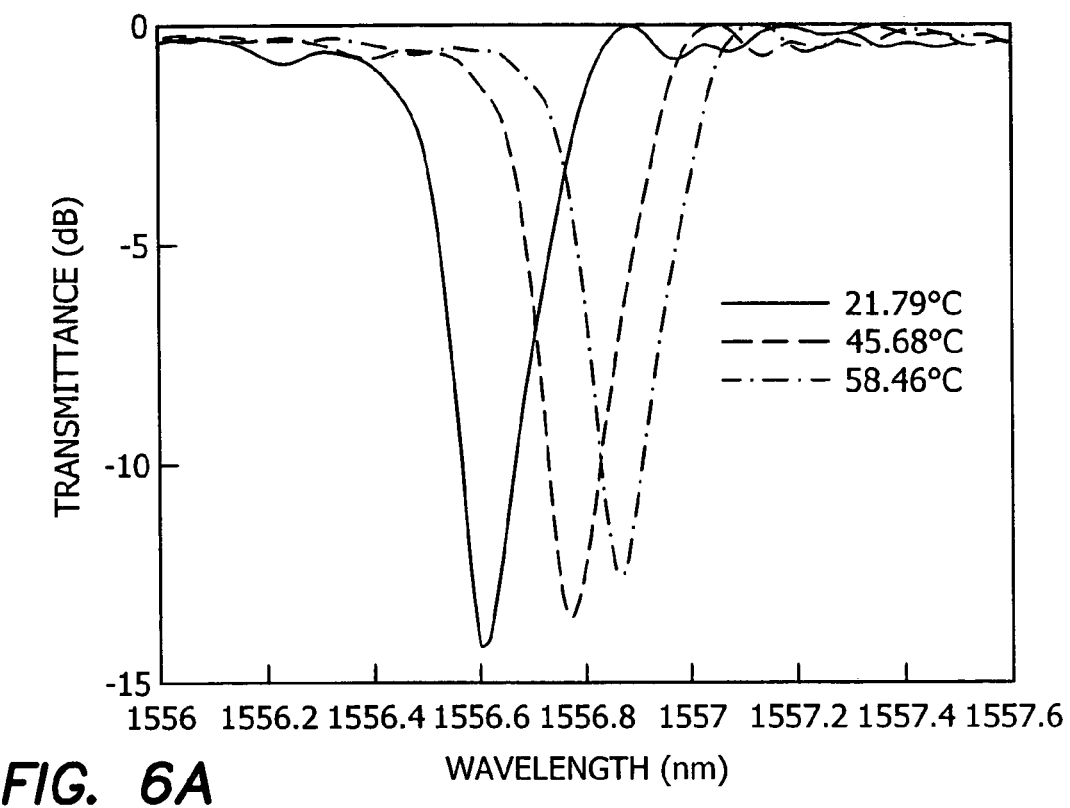
FIG. 6a is a graph of the filter response measured in the through channel at $\theta_B'=5°$ for three different temperatures.

As stated above, in the illustrated embodiment, holographic filters 18 are recorded in an iron-doped lithium niobate ($LiNbO_3$:Fe, 0.05 wt. % $Fe_2O_3$) crystal by interfering two coherent continuous wave (cw) laser beams inside the crystal, as shown in FIG. 1. The crystal sample dimensions are 2.0 cm×1.0 cm×0.3 cm with its c-axis running parallel to the longest edge and the concentration of $Fe^{2+}$ is $1.283\times10^{24}$ $m^{-3}$. As in the case of FIG. 3 the transmittance of a typical filter at an incident angle $\theta_B'=5°$ is shown in FIG. 6(a) for three temperatures different than those in FIG. 3. The Bragg wavelength $\lambda_B$ of the recorded filter at 21.79° C. is measured to be 1556.61 nm. The filter efficiency is dropping due to hologram decay at elevated temperatures since the hologram was not thermally fixed.

Figure 7:
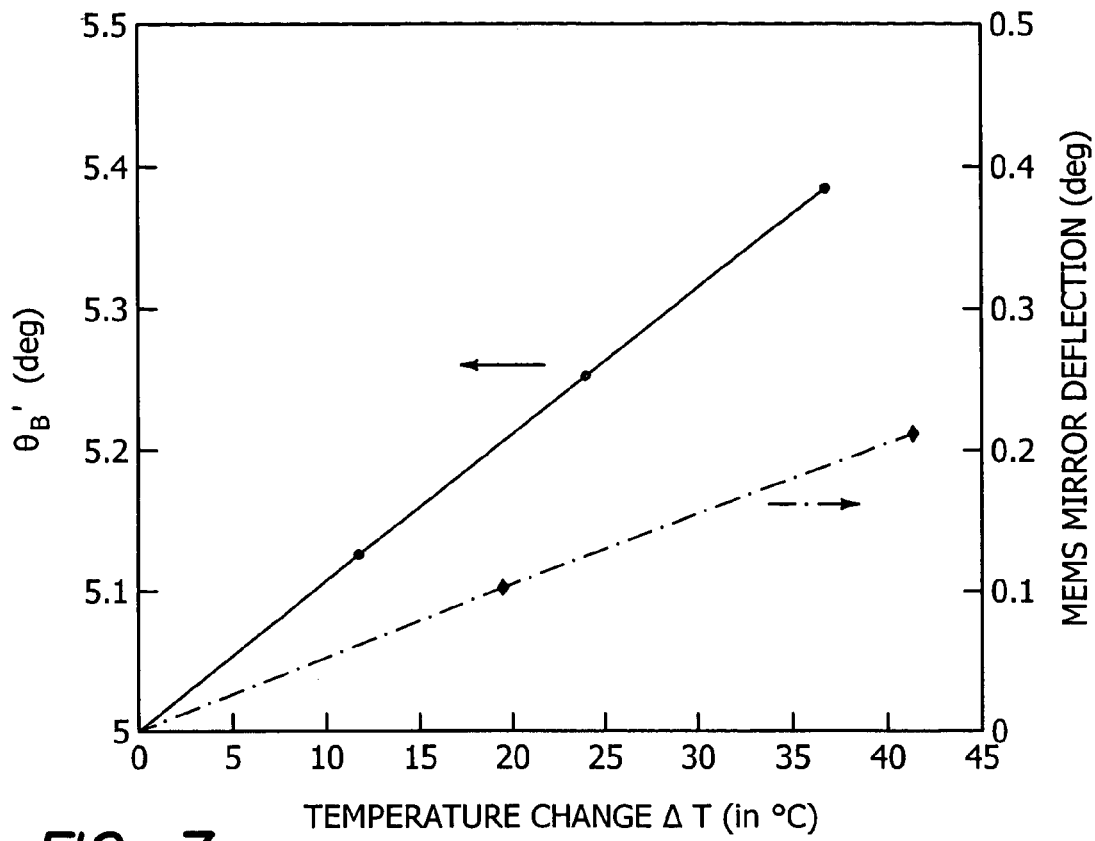
FIG. 7 is a graph which depicts in a solid curve the calculated optimal compensation angle $\theta_B'$ as a function of temperature change $\Delta T$ and in the dash-dot curve is the measured angular deflection of the MEMS mirror subject to $\Delta T$.

To specify the MEMS mirror parameters, we first figure out the Bragg wavelengths for a series of incident angles at four different temperatures (21.79° C., 33.36° C., 45.68° C., 58.46° C.). Temperature monitoring is made possible by reading the resistance off a thermistor in close contact with the $LiNbO_3$ crystal when the whole system is in thermal equilibrium. A thermoelectric (TE) cooler 34 is used to control the temperature of the system. The Bragg wavelength corresponding to the incident angle $\theta_B'=5°$ ($\theta_B\cong2.25°$, at the lowest temperature is chosen as the target wavelength that will be maintained constant through angular compensation. By doing a fit of the data to equation (3), we end up with the optimal compensation angles as a function of temperature change. This is plotted as a solid line in FIG. 7.

Our data suggest that for operation around an incident angle $\theta_B'=5°$, an angular correction of 1.18 degrees will be required for a temperature change of 100° C. The aluminum-silicon composite beam was designed to deflect about 0.59 degrees for a temperature change of 100° C.

Figure 8:
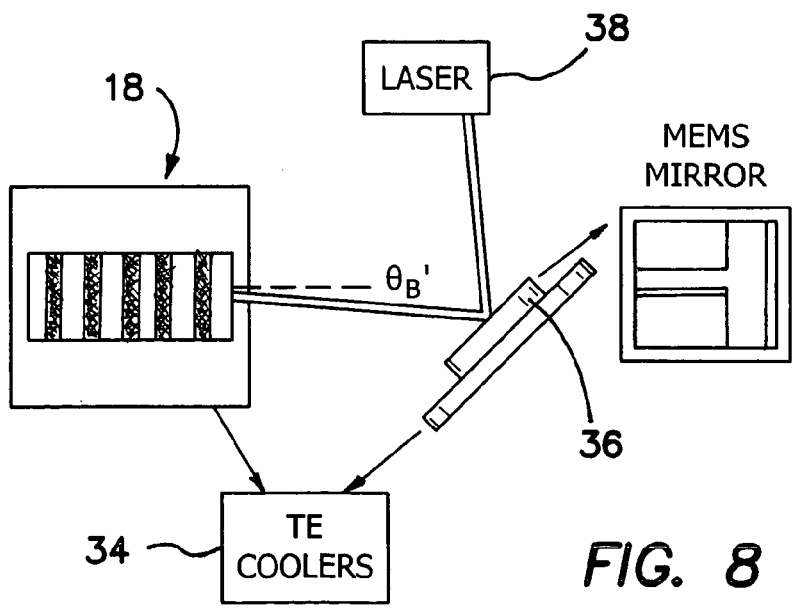
FIG. 8 is a diagram of an embodiment combining the thermally driven MEMS mirror with the recorded holographic filter to realize the athermal filter design.

A diagram of the MEMS mirror 36 is shown in FIG. 8. It's composed of two parts: a mirror part (surface dimensions 1.0 mm×3.0 mm, 50 nm of gold deposited on 0.45 mm silicon gives a reflectance of 85% at 1550 nm) and a beam (surface dimensions 2.0 mm×0.5 mm, 500 nm aluminum deposited on 0.025 mm silicon), which deflects as the temperature varies. The measured deflection angle of the mirror as a function of temperature is also plotted in FIG. 7.

Figure 6B:
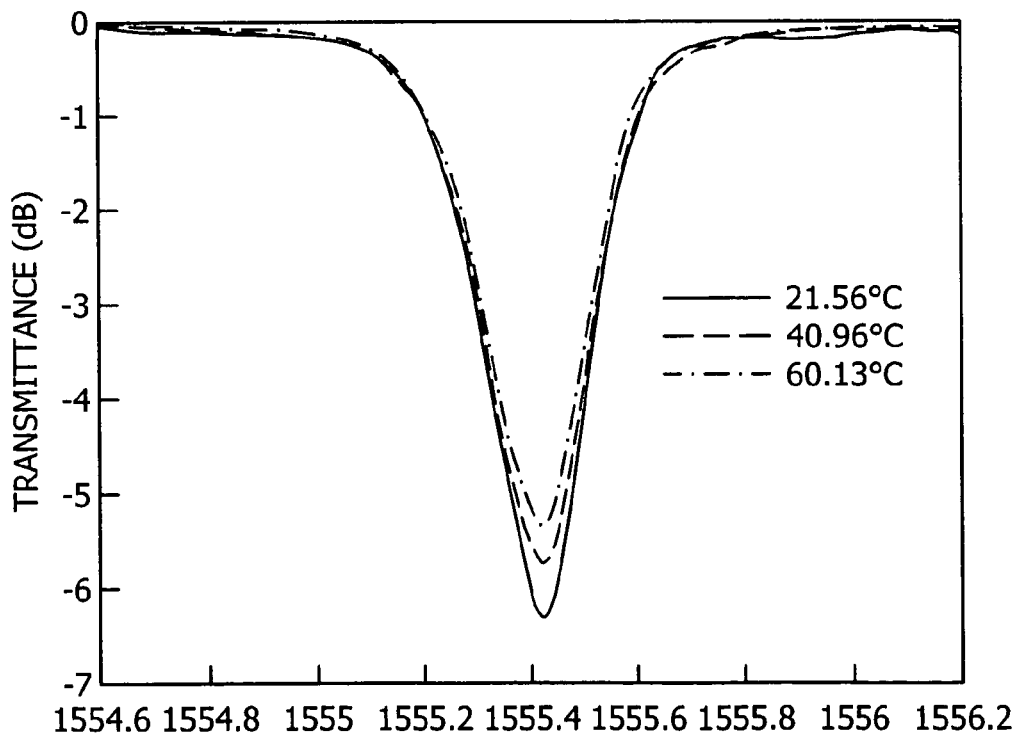
FIG. 6b is a graph of the filter response measured in the through channel at $\theta_B'=5°$ for three different temperatures with the compensating.

We mount the holographic filter 18 and the MEMS mirror 36 on two separate TE coolers 34 symbolically depicted in FIG. 8. Two identical thermistors (not shown) are used to monitor the temperatures of the filter 18 and the mirror 36. The output from a tunable laser 38 is reflected off the mirror 36 toward the filter 18 at an (outside) incident angle of 5 degrees. At this point both the filter 18 and the mirror 36 are at room temperature. The filter response is measured and the Bragg wavelength is determined. Then the TE coolers 34 are turned on and raise the temperatures of both mirror 36 and filter 18. The readings of the two thermistors are kept the same throughout the measurements of filter response. The filter shapes at $\theta_B'=5°$ for three different temperatures are plotted in FIG. 6(b). Compared with FIG. 6(a), the drift of the Bragg wavelength is indeed compensated for by the deflection of the mirror. The compensation can be done easily in practice because the response time of the MEMS mirror is much shorter than that of the bulkier $LiNbO_3$ crystal.

Figure 9:
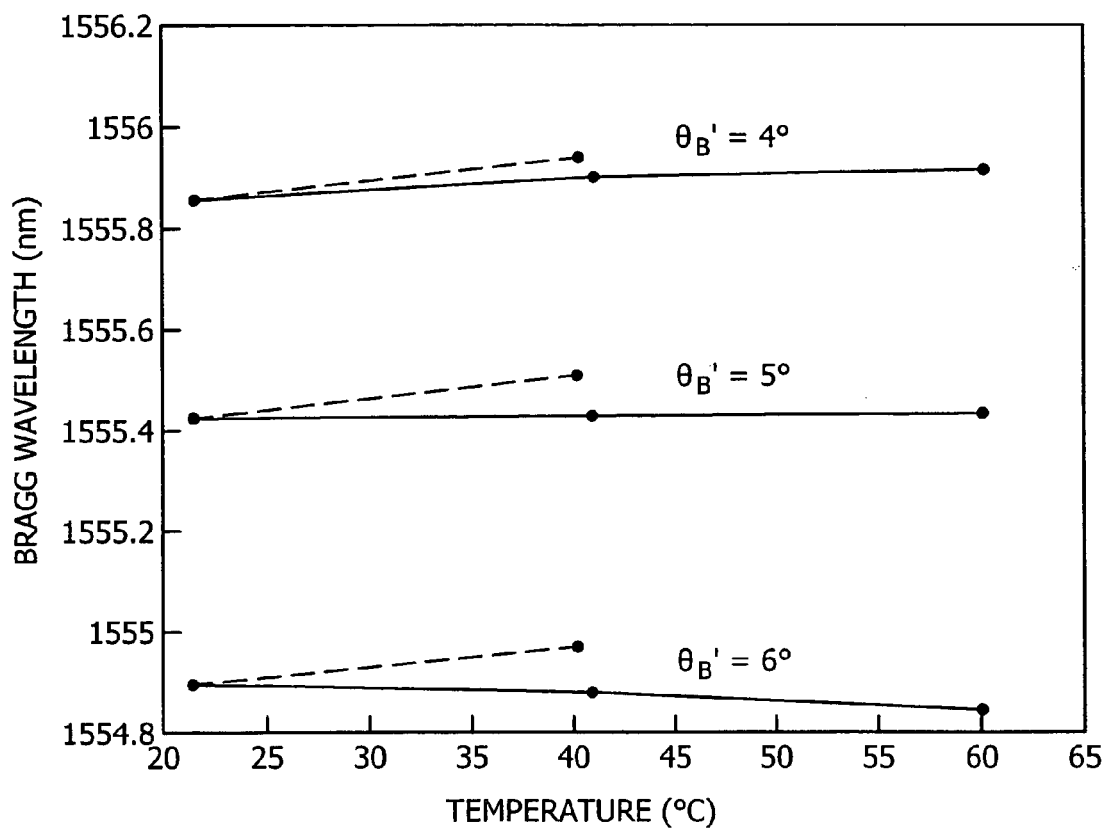
FIG. 9 is a graph showing the Bragg wavelengths measured with the athermal design for three different incident angles versus temperature.

In FIG. 9 we plot the Bragg wavelengths measured with the athermal design for three different incident angles. The dashed lines indicate the drifts of Bragg wavelengths due to the raised temperature in the absence of mirror compensation. We can see that for $\theta_B'=5°$, the Bragg wavelength remains constant between 21° C. and 60° C., which corroborates the validity of the athermal design. Without the athermal mechanism, the Bragg wavelength would drift about 0.16 nm (20 GHz) from 21° C. to 60° C. The Bragg wavelengths for $\theta_B'=4°$ are seen to increase with the rising temperature despite the counteracting MEMS operation although they do not increase quite as much as when there's no compensation mechanism; on the other hand, the Bragg wavelengths for $\theta_B'=6°$ are decreasing with the rising temperature because they are overcompensated by the MEMS mirror deflection. The athermal WDM filter design employing the MEMS mirror 36 keeps the Bragg wavelength constant; however, to couple the reflected or transmitted beam back into a fiber, another counteracting MEMS mirror must be used to undo the beam walk-off.

Since many thermally actuated MEMS devices consist of materials that possess different mechanical properties, they can suffer from hysteresis. The Bragg wavelength of the athermal filter system undergoes a 0.09 nm (11.25 GHz) decrease after we cool it back down to room temperature. A possible solution to this problem is to anneal the MEMS device at an elevated temperature (about 300° C.) before use. The drift in the Bragg wavelength due to hysteresis was experimentally shown to reduce to 0.01 nm (1.25 GHz) after annealing.

Thus, we have shown that the temperature dependence of the Bragg wavelength of a holographic filter 18 can be compensated by incorporating a passive, thermally actuated MEMS mirror 36 into the system. The packaging should be such that the mirror 36 and the filter 18 thermally track each other.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A temperature compensated apparatus for filtering light comprising:
   a holographically recorded grating defined in a photosensitive layer for providing optical filtration for light incident on the grating with a predetermined angle of incidence; and
   angulation means responsive to temperature for tilting relative to the angle of incidence of the light with respect to the grating as a function of temperature of the grating so that changes in the filtration by the grating compensate for changes in temperature of the grating to maintain effective filtration of the light approximately constant.

2. The apparatus of claim 1 where the angulation means comprises a bimetallic strip having a differential thermal expansion coefficient and wherein light is reflected from or by means of the strip at the predetermined angle of incidence, the differential thermal expansion coefficient of the strip being selected to vary the curvature of the strip and hence the angle of incidence of the light by a degree approximately corresponding to the shift in filtration response of the grating as a function of temperature so that Bragg filtration provided by the grating is approximately independent of temperature of the grating.

3. The apparatus of claim 2 where the bimetallic strip is comprised of a aluminum and silicon composite.

4. The apparatus of claim 1 where the grating is characterized by a Bragg wavelength, $2n\Lambda\cos\theta_{in}=\lambda_B(T)$ where n is the index of refraction of the bulk material of the layer, $\Lambda$ is the period of the grating, $\theta_{in}$ is the internal angle of the incident light within the layer and $\lambda_B(T)$ is the Bragg wavelength as a function of temperature of the grating, T, the angulation means changing $\theta_{in}$ of the light to approximately match the change in Bragg wavelength $\lambda_B(T)$ for a change in temperature, $\Delta T$.

5. The apparatus of claim 4 where the Bragg wavelength $\lambda_B(T)$ is determined by a 0.5 dB criterion.

6. The apparatus of claim 1 where the angulation means changes the angle of incidence of the light according to $$\frac{\cos(\theta_B + \Delta\theta)}{\cos\theta_B} = \frac{1}{(1+a\Delta T)(1+b\Delta T)}$$

where $\Delta T$ is the change in temperature of the grating, where a is the thermal expansion coefficient of the layer, where b is the thermal coefficient of the dielectric constant and hence the index of refraction of the layer, where $\theta_B$ is the Bragg angle corresponding to a target wavelength for filtration when $\Delta T=0$, and where $\Delta\theta_B$ is the change in the Bragg angle made to compensate to the temperature change $\Delta T$.

7. The apparatus of claim 1 where the angulation means is annealed to reduce hysteresis.

8. The apparatus of claim 1 where the angulation means and the grating are thermally coupled to each.

9. A method for temperature compensating a Bragg filter comprising:
   providing a holographically recorded grating defined in a photosensitive layer for providing optical filtration;
   directing light incident on the grating at a predetermined angle of incidence; and
   controlling the angle of incidence of the light relative to the grating in response to temperature changes in the grating so that filtration by the grating compensates for changes in temperature of the grating to keep effective filtration approximately constant.

10. The method of claim 9 where controlling the angle of incidence of the light relative to the grating comprises:
    reflecting the light from a bimetallic strip having a differential thermal expansion coefficient onto the grating; and
    varying the curvature of the strip and hence the angle of incidence of the light onto the grating to the shift the Bragg filtration of the grating according to the change in temperature so that effective filtration provided by the grating is approximately independent of temperature of the grating.

11. The method of claim 10 where reflecting the light from a bimetallic strip reflects the light from a strip comprised of a aluminum and silicon composite.

12. The method of claim 9 where the grating is characterized by a Bragg wavelength, $2n\Lambda\cos\theta_{in}=\lambda_B(T)$ where n is the index of refraction of the bulk material of the layer, $\Lambda$ is the period of the grating, $\theta_{in}$ is the internal angle of the incident light within the layer and $\lambda_B(T)$ is the Bragg wavelength as a function of temperature of the grating, T, and where controlling the angle of incidence of the light relative to the grating changes $\theta_{in}$ of the light to approximately match the change in Bragg wavelength $\lambda_B(T)$ for a change in temperature, $\Delta T$.

13. The method of claim 10 further comprising determining the Bragg wavelength $\lambda_B(T)$ by a 0.5 dB criterion.

14. The method of claim 9 where controlling the angle of incidence of the light relative to the grating changes the angle of incidence of the light according to $$\frac{\cos(\theta_B + \Delta\theta)}{\cos\theta_B} = \frac{1}{(1 + a\Delta T)(1 + b\Delta T)}$$

where $\Delta T$ is the change in temperature of the grating, where a is the thermal expansion coefficient of the layer, where b is the thermal coefficient of the dielectric constant and hence the index of refraction of the layer, where $\theta_B$ is the Bragg angle corresponding to a target wavelength for filtration when $\Delta T=0$, and where $\Delta\theta_B$ is the change in the Bragg angle made to compensate to the temperature change $\Delta T$.

15. A temperature compensated apparatus for filtering light comprising:

a holographic filter defined in a photosensitive layer of iron doped $LiNbO_3$ for providing optical filtration for light incident with a predetermined angle of incidence at a Bragg wavelength defined at the middle of a bandwidth of transmittance through the filter; and angulation means responsive to temperature for tilting the relative angle of incidence of the light as a function of temperature with respect to the filter so that changes in the filtration compensate for changes in temperature of the filter to maintain effective filtration approximately constant.

16. The apparatus of claim 15 where the angulation means comprises a mirror coupled to a bimetallic composite strip.

17. The apparatus of claim 16 where the mirror comprises a MEMS mirror.

18. The apparatus of claim 17 where the MEMs mirror is comprised of a mirror portion including a gold film deposited on silicon and a beam of aluminum deposited on silicon which deflects as temperature varies.

19. The apparatus of claim 17 further comprising a second MEMs mirror optically coupled to the filter to correct for walk-off to allow coupling with an optic fiber.

20. The apparatus of claim 15 where the angulation means is annealed to reduce hysteresis.

* * * * *